United States Patent [19]
Li

[11] Patent Number: 6,092,821
[45] Date of Patent: Jul. 25, 2000

[54] VEHICLE PEDAL POWER SAVING MECHANISM

[76] Inventor: Shu-Shien Li, 5F, No. 21, Lane 16, Sec. 2, Chung Shan N. Rd., Taipei, Taiwan

[21] Appl. No.: 09/204,564

[22] Filed: Dec. 4, 1998

[51] Int. Cl.[7] .................................................. B62M 1/10
[52] U.S. Cl. ................................ 280/212; 74/594.2
[58] Field of Search ................................ 280/212, 214, 280/215, 259; 74/594.1, 594.2, 597.3; D12/124

[56] References Cited

U.S. PATENT DOCUMENTS

| | | | |
|---|---|---|---|
| 2,484,472 | 10/1949 | Simpson | 280/212 |
| 2,965,393 | 3/1960 | Cauchon | 280/212 |
| 5,035,678 | 7/1991 | Hageman | 474/50 |
| 5,188,003 | 2/1993 | Trammell, Jr. | 74/594.3 |

*Primary Examiner*—Brian L. Johnson
*Assistant Examiner*—Tony Winner
*Attorney, Agent, or Firm*—Bacon & Thomas, PLLC

[57] ABSTRACT

A vehicle pedal power saving mechanism mounted on the axle of the pedal cranks of a vehicle to facilitate pedaling of the pedal cranks, the vehicle pedal power saving mechanism including a side board mounted on the frame structure of the vehicle, a big gear coupled to the axle of the pedal cranks by an one-way ratchet wheel assembly, a small gear meshed with the big gear, a piston moved in a cylindrical shell at the side board and supported on a spring member inside the cylindrical shell, and a link coupled between the piston and a pivot at the small gear to reciprocate the piston upon rotary motion of the big gear and the small gear.

7 Claims, 9 Drawing Sheets

६,०९२,८२१

VEHICLE PEDAL POWER SAVING MECHANISM

BACKGROUND OF THE INVENTION a) Field of the Invention

The present invention relates to a vehicle pedal power saving mechanism for a pedal-driven vehicle, and more particularly to such a vehicle pedal power saving mechanism which uses a gear set and a piston unit to change a rotary motion to a linear motion, causing a spring to alternatively reserve energy and release reserved energy, so as to facilitate pedaling of the pedal cranks of the vehicle.

(b) Description of the Prior Art

The pedal transmission mechanism of a pedal-driven vehicle for example a bicycle, generally comprises an axle, two pedal cranks connected to two opposite ends of the axle, a chain wheel mounted on the axle and turned with the axle when the pedal cranks are pedaled, a rear hub sprocket mounted on the rear hub of the rear wheel, and a chain coupled between the chain wheel and the rear hub sprocket. When the pedal cranks are pedaled by legs, the chain wheel is rotated with the axle, thereby causing the rear hub sprocket to be driven by the chain to rotate the rear wheel of the bicycle. When pedaling the crank pedals through 360°, the pedal cranks cannot positively receive applied force from the legs of the rider at a particular angle. As illustrated in FIG. 1, a complete rotary stroke of the pedal cranks is divided into four segments. When at the segment A, the pedal crank 10 or 20 can easily be pushed forwards with less effort. However, when at the segment B or the segment D, the rider must applied much effort to push the pedal crank 10 or 20 forwards. Because much effort must be applied to the pedal crank 10 or 20 when at the segment B or the segment D, it is difficult to keep the rear wheel of the bicycle to be rotated at a constant speed.

SUMMARY OF THE INVENTION

The present invention has been accomplished under the circumstances in view. According to one aspect of the present invention, the vehicle pedal power saving mechanism is designed to be mounted on the axle of the pedal cranks of a vehicle, which can be a bicycle, a motorcycle or a tricycle, to facilitate pedaling of the pedal cranks, the vehicle pedal power saving mechanism comprising a side board mounted on the frame structure of the vehicle, a big gear coupled to the axle of the pedal cranks by an one-way ratchet wheel assembly, a small gear meshed with the big gear, a piston moved in a cylindrical shell at the side board and supported on a spring member inside the cylindrical shell, and a link coupled between the piston and a pivot at the small gear to reciprocate the piston upon rotary motion of the big gear and the small gear. The spring member is alternatively compressed and released during reciprocating motion of the piston. When compressed, the spring member reserves energy. When released, the spring member imparts reserved energy to the link through the link, causing the small gear to be rotated forwards. According to another aspect of the present invention, the side board can be coupled to the axle of the crank pedals at either end, and fastened to the chain stay, seat tube or down tube of the vehicle as desired.

FIGS. from 7A through 7D illustrates the operation of the present invention.

Figure 8:
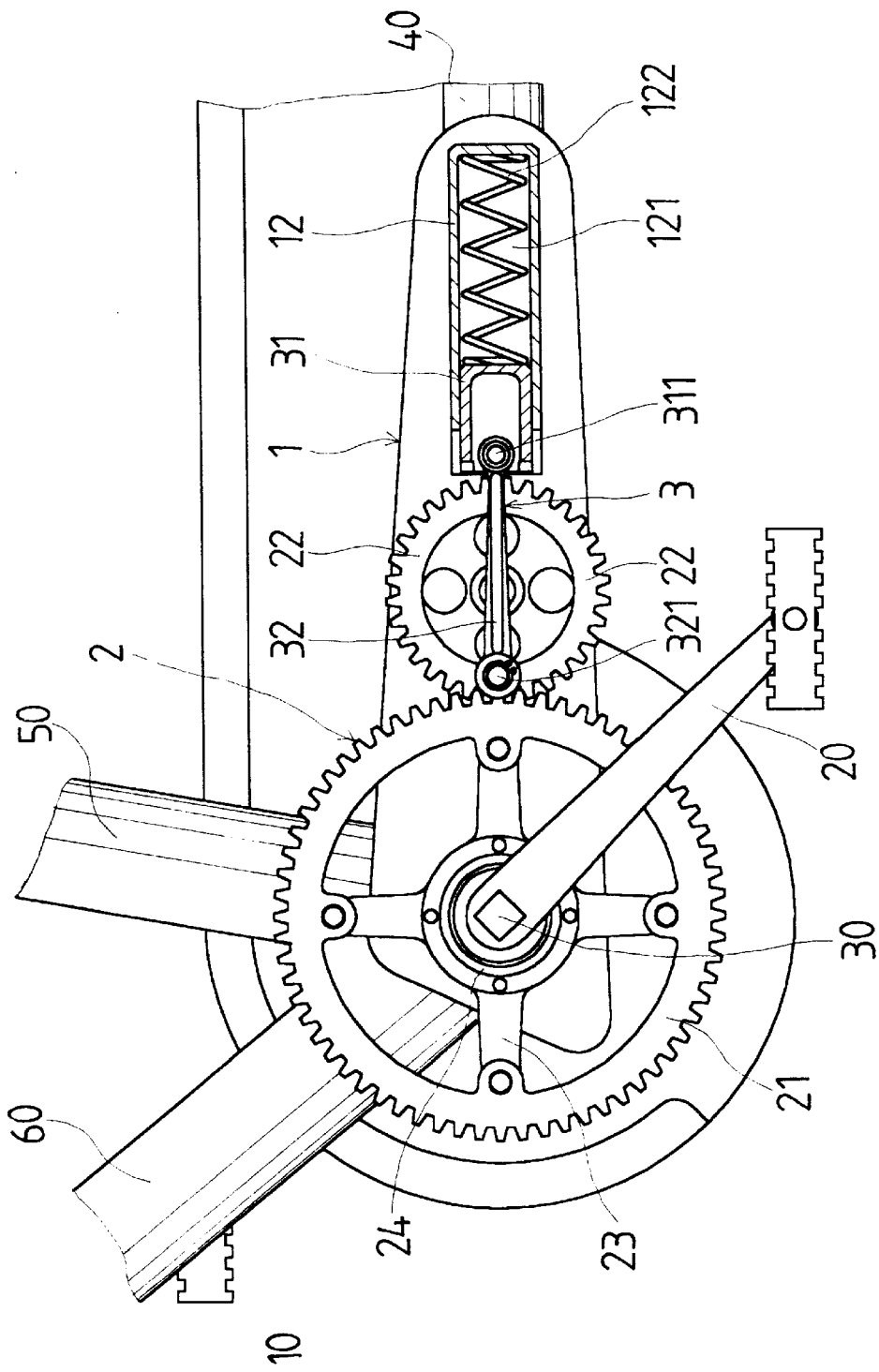

FIG. 8 is an applied view of the present invention, showing the side board fastened to the chain stay of the vehicle.

Figure 9:
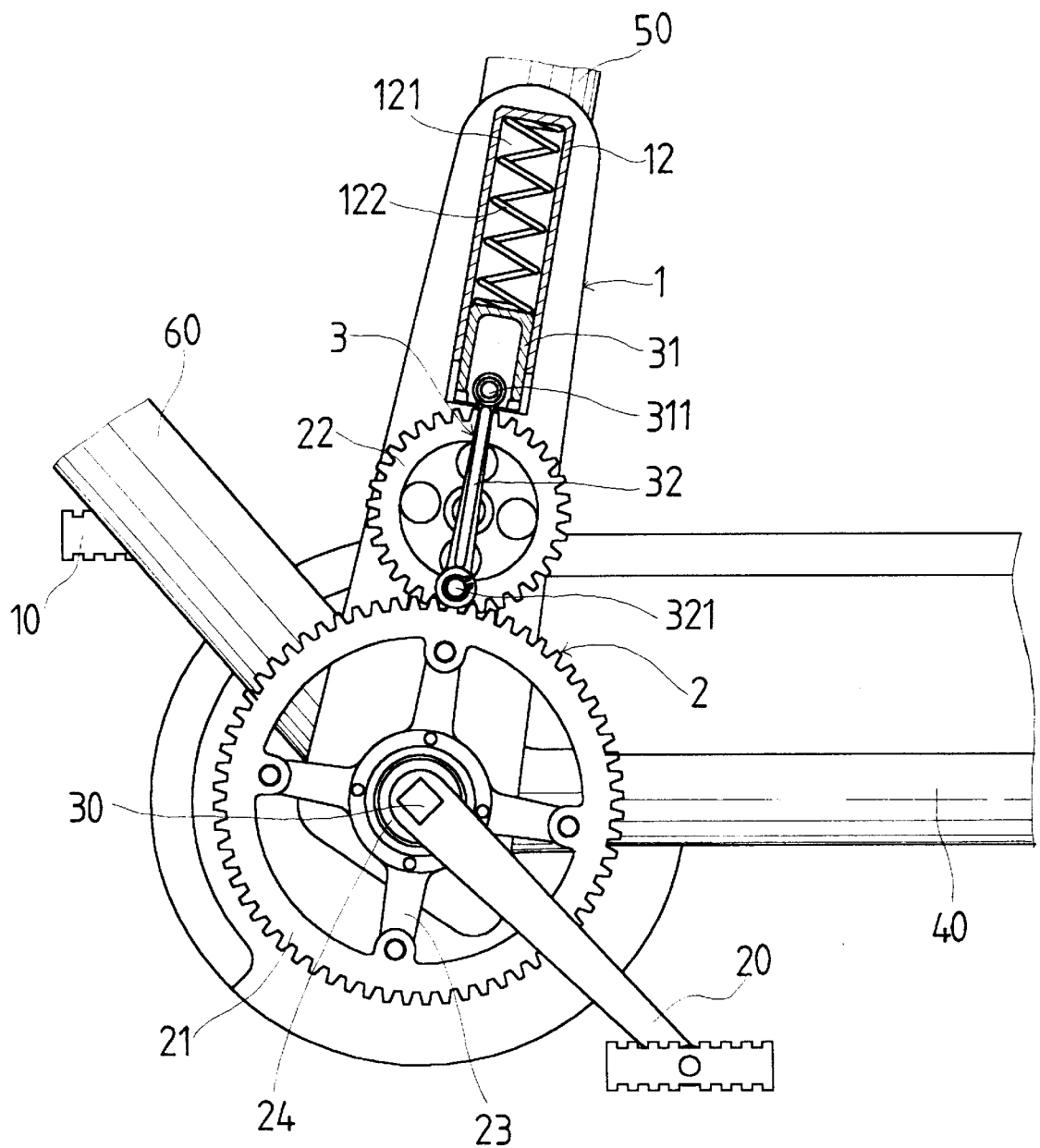

FIG. 9 is another applied view of the present invention. showing the side board fastened to the seat tube of the vehicle.

Figure 10:
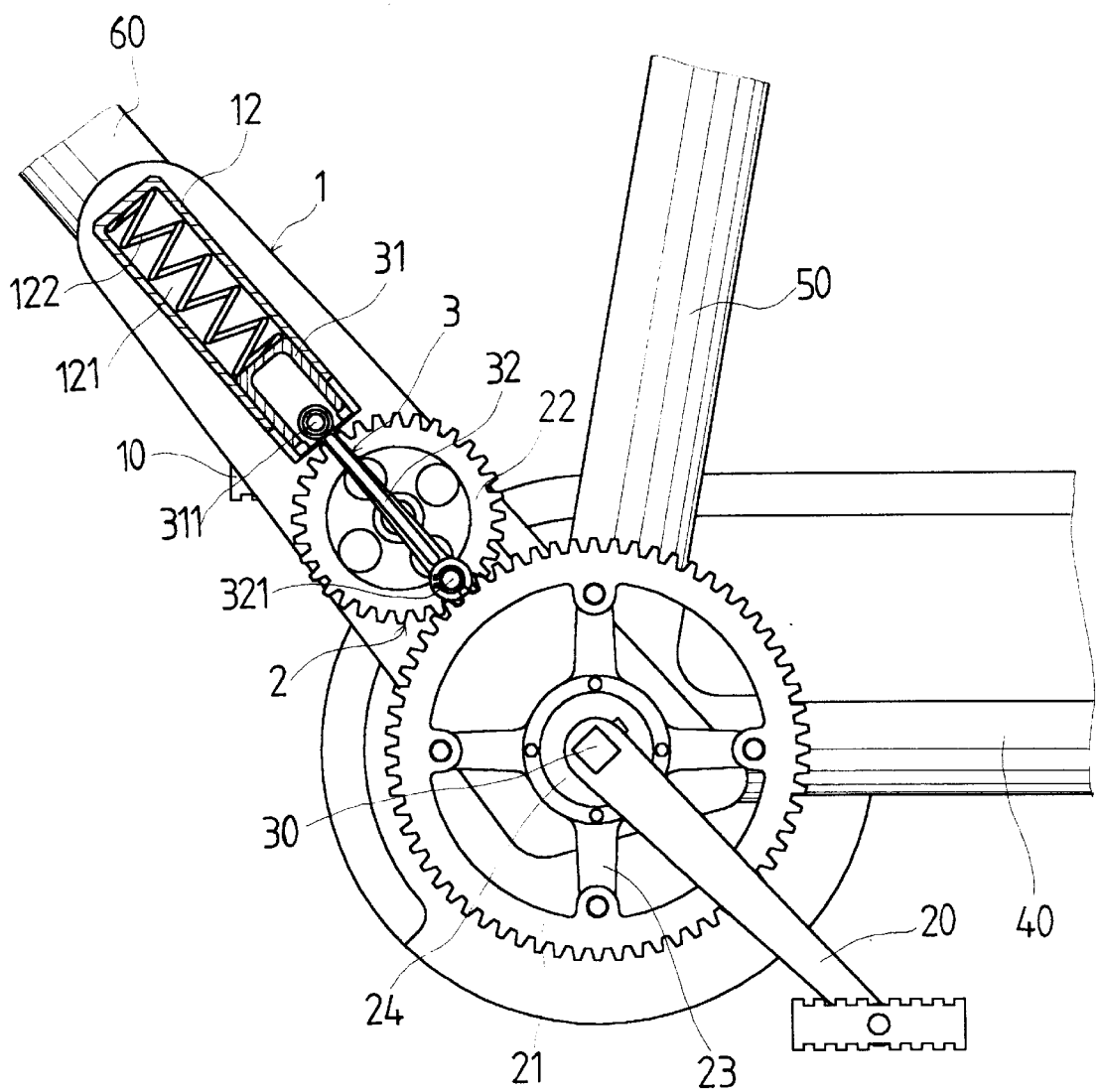

FIG. 10 is still another applied view of the present invention, showing the side board fastened to the down tube of the vehicle.

DETAILED DESCRIPTION OF THE PREFERRED EMBODIMENT

Referring to FIGS. from 2 through 4, the present invention is generally comprised of a side board 1, a gear set 2. and a piston unit 3.

Figure 6:
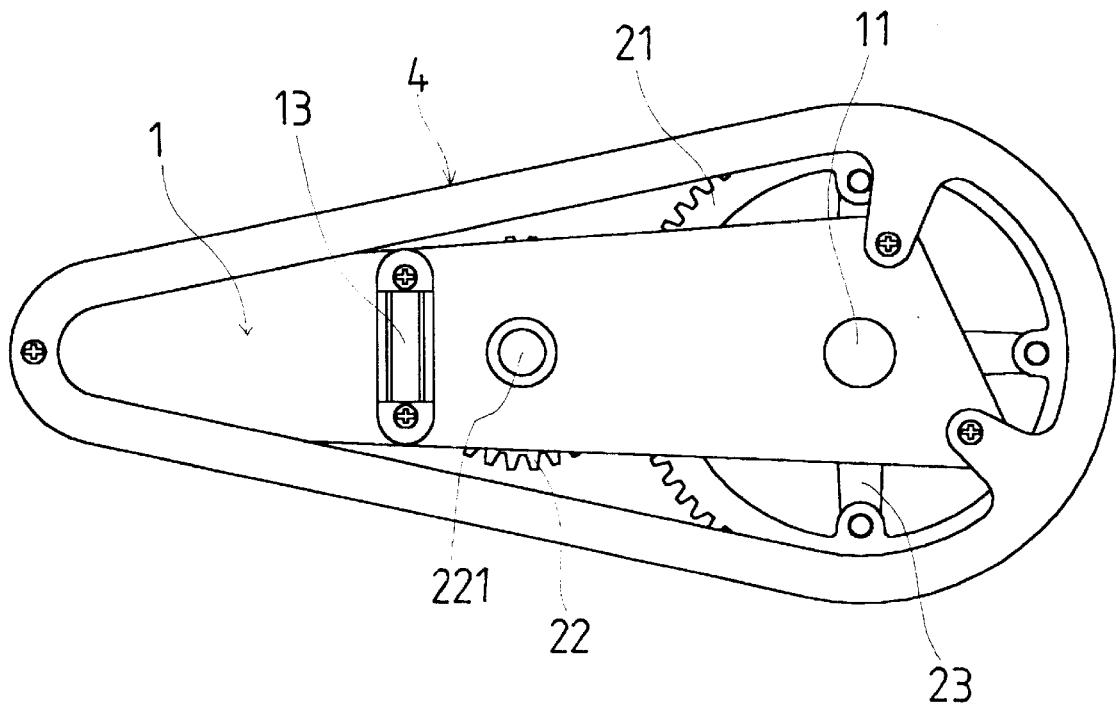
FIG. 6 is a back side view of the present invention.

The side board 1 is a flat board having a round hole 11 near one end namely the front end, which receives an axle 30, which has two pedal cranks 20 and 10 connected to its two opposite ends, a cylindrical shell 12 at the front side wall thereof near an opposite end namely the rear end, and a substantially Ω-shaped locating plate 13 at the back side wall thereof (see also FIG. 6). The Ω-shaped locating plate 13 enables the side board 1 to be fastened to the frame structure of the vehicle. The cylindrical shell 12 defines a cylindrical receiving chamber 121, which receives a compression spring 122.

The gear set 2 comprises a big gear 21 and a small gear 22. The gear ratio between the big gear 21 and the small gear 22 is 1:2, i.e., the small gear 22 is rotated through 2 runs when the big gear 21 is rotated through one run. The big gear 21 has an annular shape, and a crossed rib 23 at the center. An one-way ratchet wheel assembly 24 is mounted at the center of the crossed rib 23. The ratchet wheel assembly 24 has a square center hole 241, which receives the axle 30, enabling the ratchet wheel assembly 24 to be rotated with the axle 30. The ratchet wheel assembly 24 enables the big gear 21 to be rotated by the pedal cranks 10 and 20 in one direction only. When the pedal cranks 10 and 20 are pedaled forwards, the big gear 21 is rotated. On the contrary, when the pedal cranks 10 and 20 are pedaled backwards, the big gear 21 does no work. The small gear 22 is mounted on a shaft 221 at the side board 1, and meshed with the big gear 21.

The piston unit 3 comprises a hollow cylindrical piston 31, and a link 32. The hollow cylindrical piston 31 is moved in the cylindrical receiving chamber 121 inside the cylindrical shell 12, and supported on the compression spring 122. The hollow cylindrical piston 31 has a front open side covered with a piston cap 311. The link 32 has one end coupled to the piston cap 311 of the hollow cylindrical piston 31, and an opposite end pivoted to the small gear 22 at one side by a pivot 321.

Because the link 32 has one end coupled to the piston cap 311 of the hollow cylindrical piston 31, which is supported on the compression spring 122 and moved in the cylindrical receiving chamber 121 of the cylindrical shell 12, the piston unit 3 is driven to make a reciprocating motion upon rotary motion of the gear set 2. When the piston 31 of the piston unit 3 is moved backwards in the cylindrical receiving chamber 121 inside the cylindrical shell 12, the compression spring 122 is compressed to reserve energy. When the piston unit 3 is moved forwards, reserved energy is released from the compression spring 122 to the piston unit 3, thereby causing the rotary motion of the gear set 2 to be accelerated.

Figure 1:
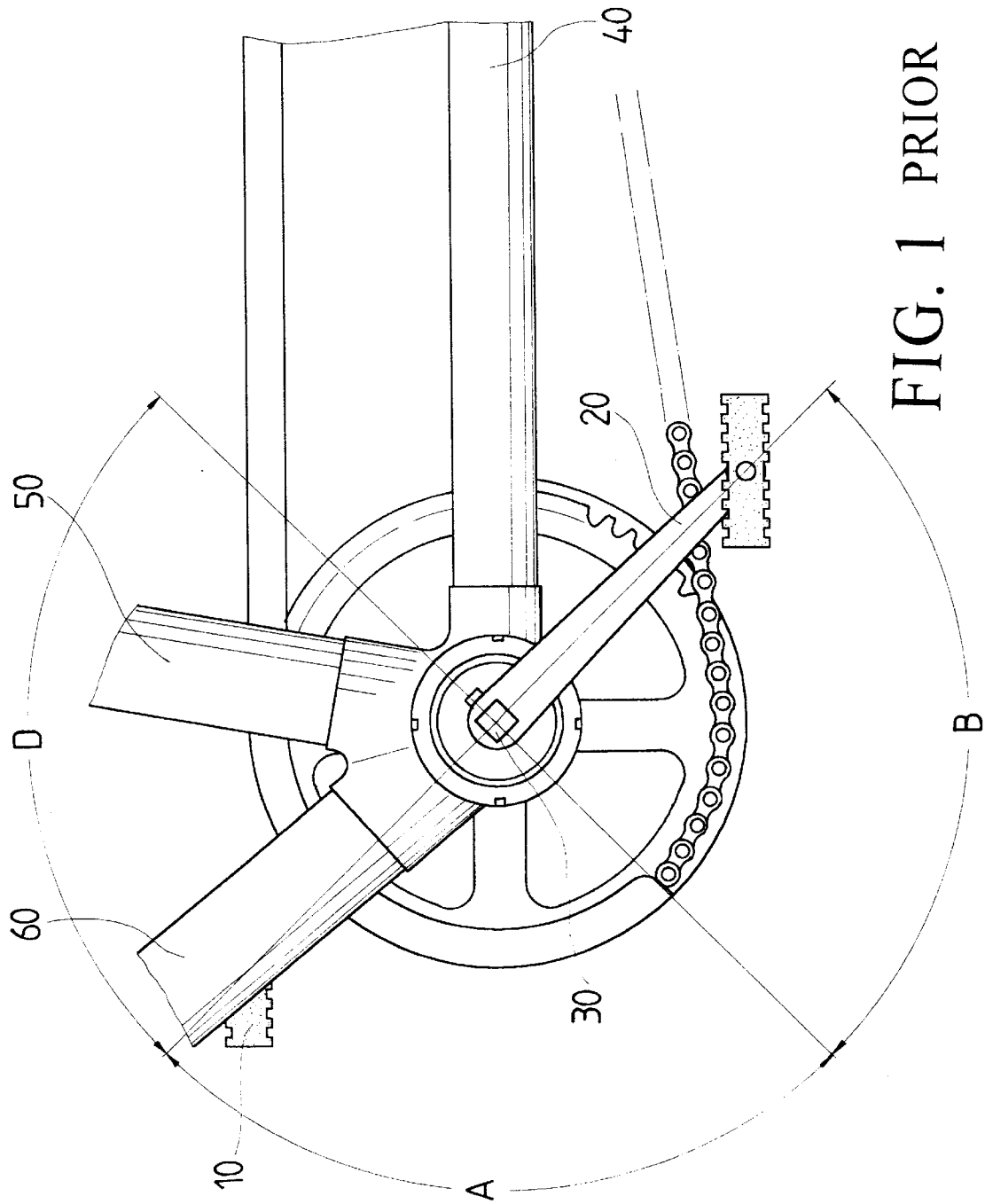
FIG. 1 illustrates the operation of the pedal cranks of a bicycle according to the prior art.
Figure 2:
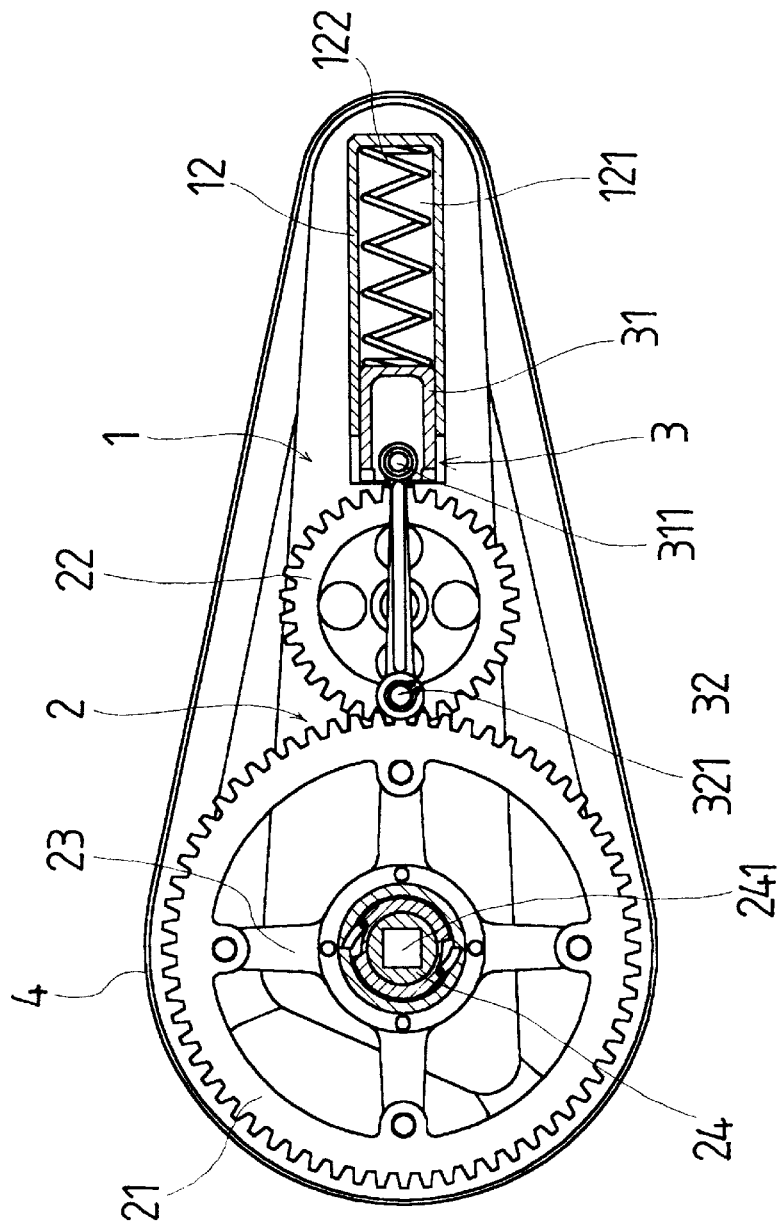
FIG. 2 is a front side view in section of the present invention.
Figure 3:
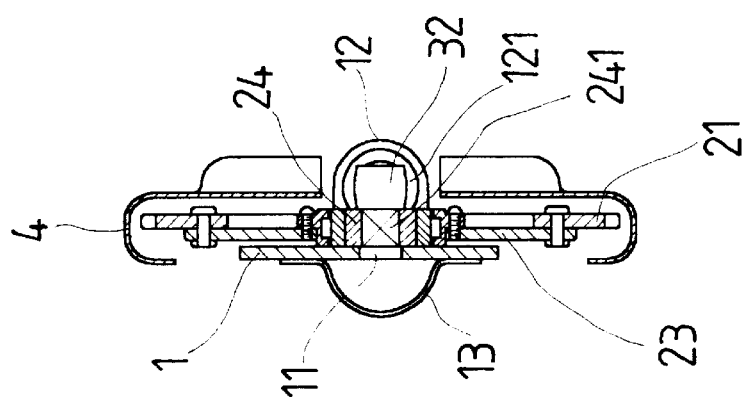
FIG. 3 is a cross sectional view of the present invention across the big gear.
Figure 4:
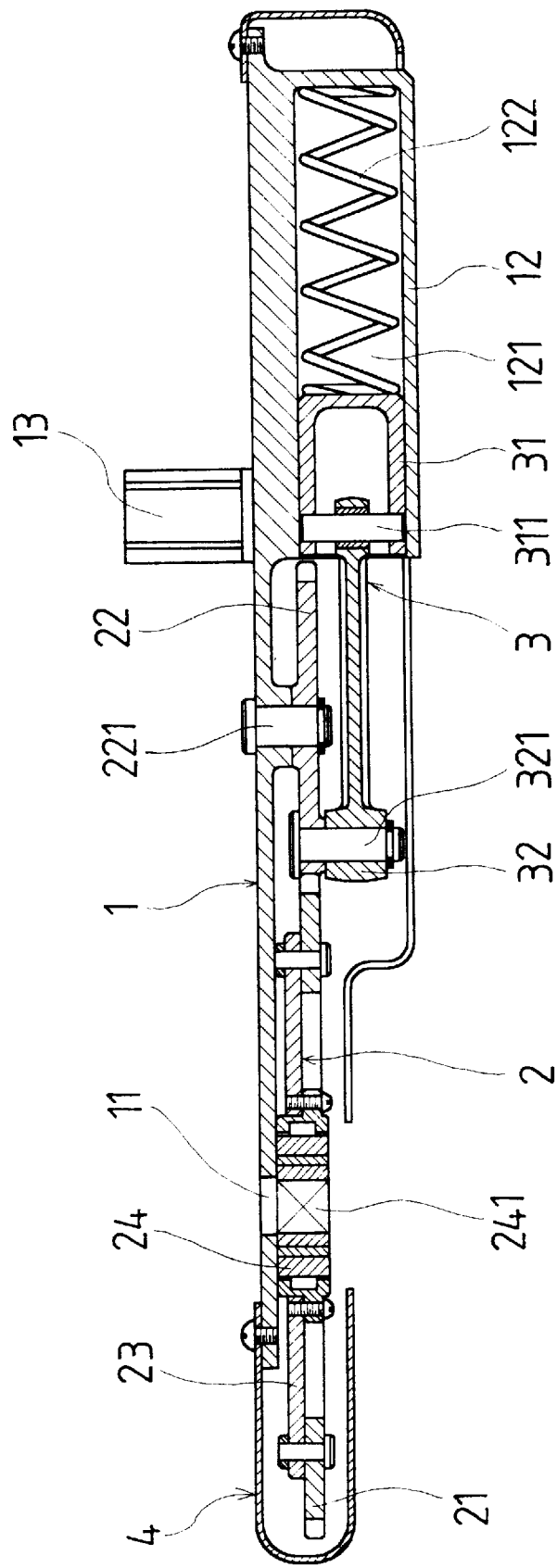
FIG. 4 is a top view in section of the present invention.
Figure 5:
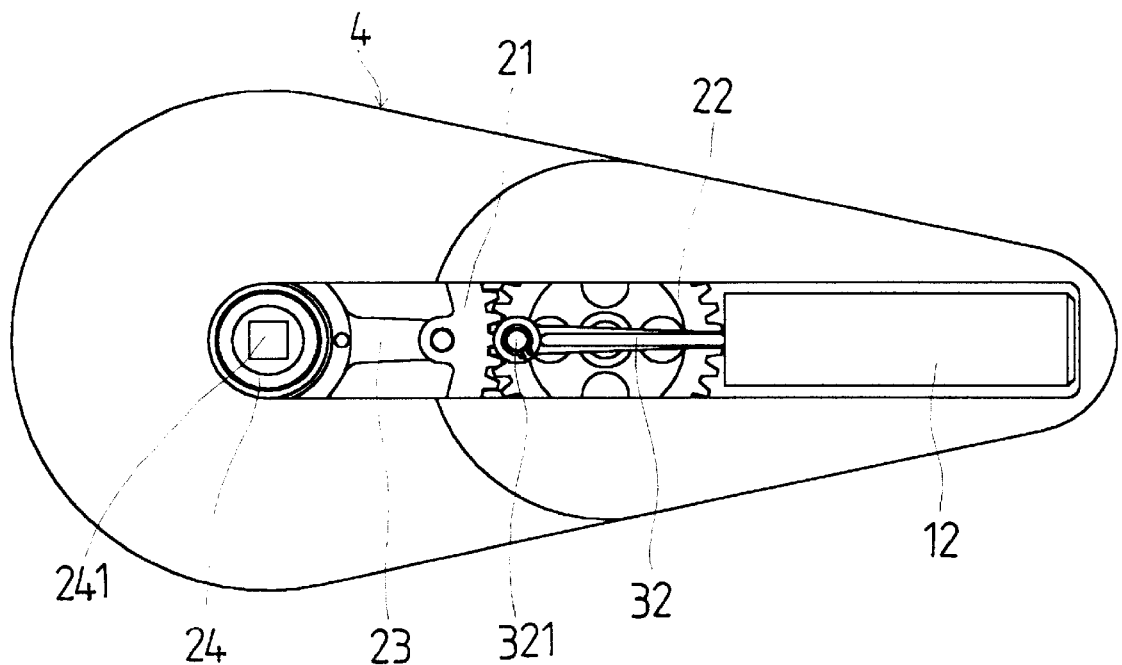
FIG. 5 is a front side view of the present invention.

Referring to FIGS. 5 and 6, a guard 4 which is made from a metal plate by stamping is covered on the side board 1 to protect keep the gear set 2 and the piston unit 3, and to keep the gear set 2 and the piston unit 3 from sight.

Figure 7A:
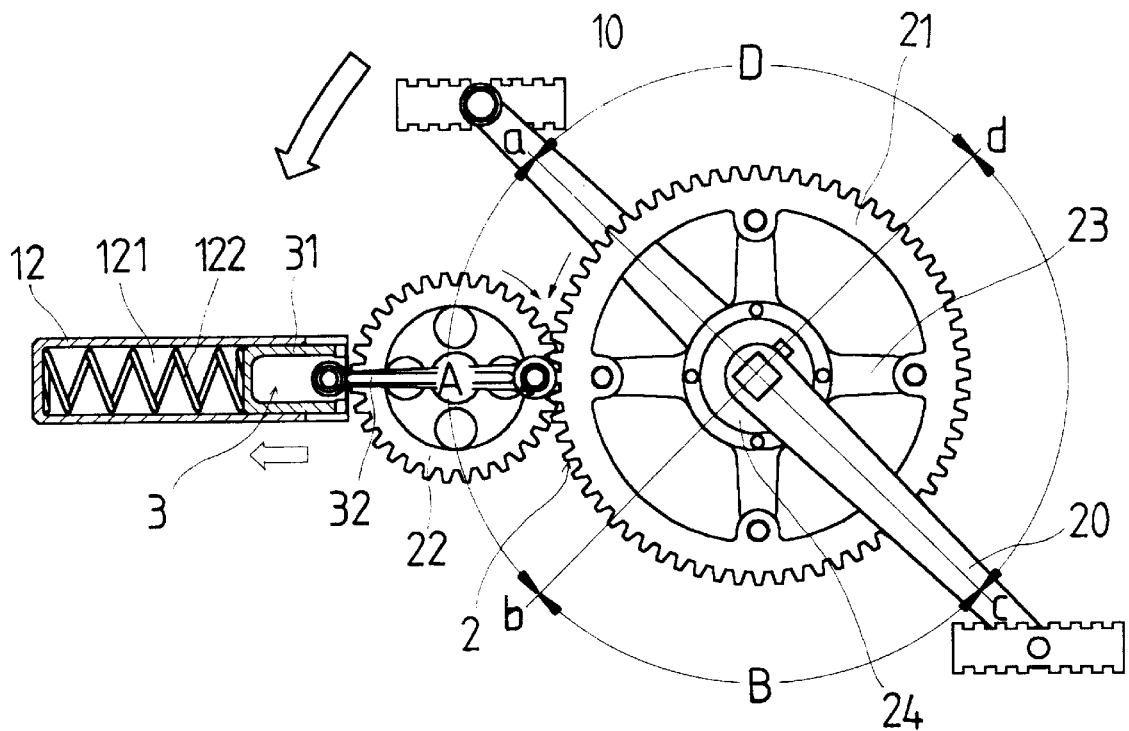
Figure 7B:
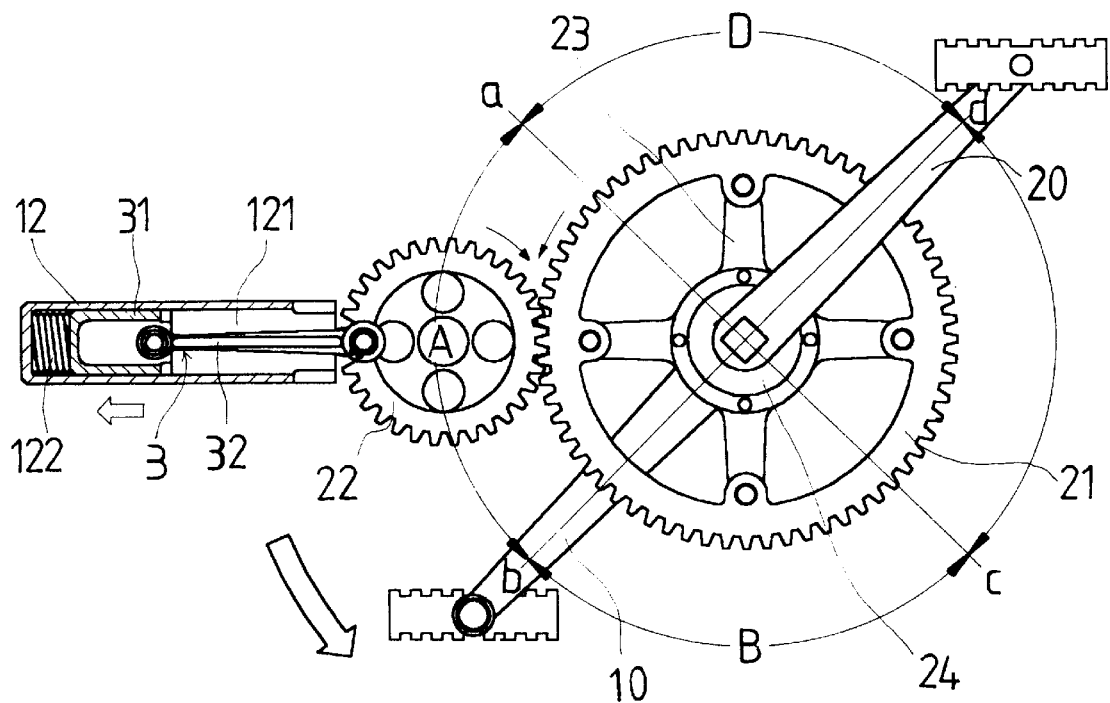
Figure 7D:
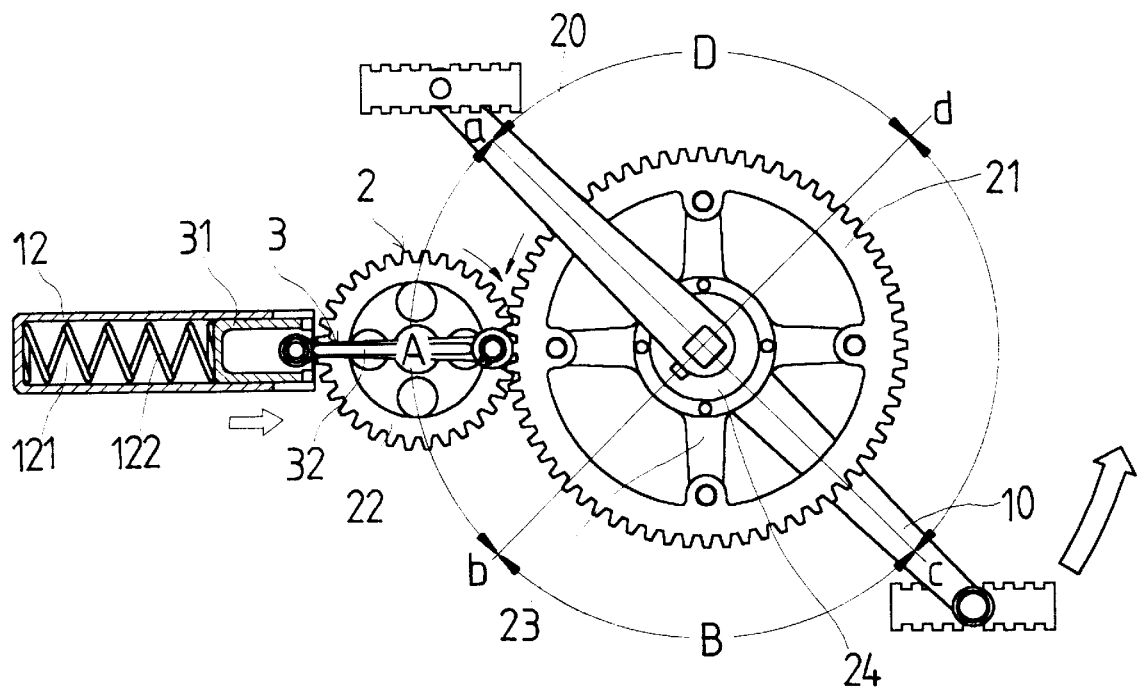
Figure 7C:
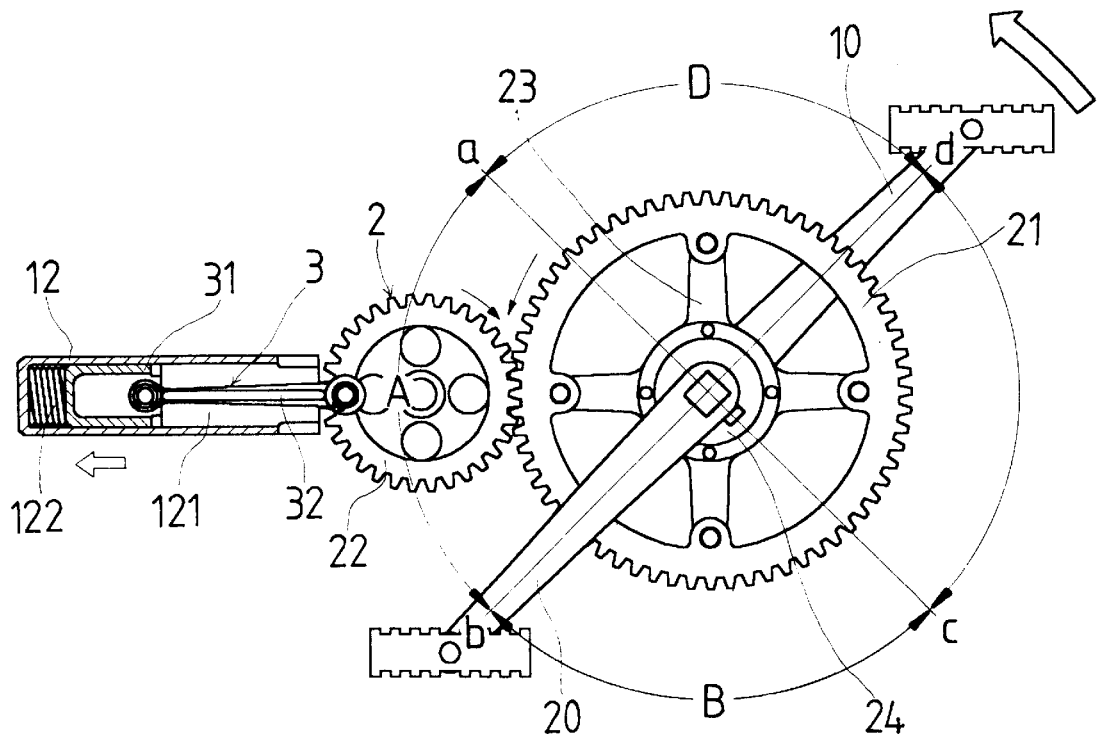

Referring to FIGS. from 7A through 7D, when the right pedal crank 10 is moved to position a, the left pedal crank 20 is moved to position c, and the segment of applied force A between position a and position b is the most efficient segment of applied force (see FIG. 7A). The segment of applied force A is a quarter of one rotary stroke of the big gear 21. When the right pedal crank 10 is moved from position a to position b, the left pedal crank 20 is moved from position c to position d (see FIG. 7B), the small gear 22 is rotated through a half run, and the piston 31 is forced backwards by the link 32 to compress the compression spring 122, causing the compression spring 122 to reserve energy. When the right pedal crank 10 is moved from position b to position c, the left pedal crank 20 is moved from position d to position a, and the segment of applied force B between position b and position c is a less efficient segment of applied force (see FIG. 7C). When the right pedal crank 10 is moved from position d to position a, the segment of applied force D between position d and position a is an efficient segment of applied force. At this stage, it is hard to pedal the left pedal crank 20 from position b to position c. However, because reserved energy is released from the compression spring 122, the piston 31 and the link 32 are forced forwards to accelerate the rotation of the small gear 22 and the big gear 21, thereby causing the left pedal crank 20 to be efficiently moved from position b to position c. When the left pedal crank 20 is moved from position a to position b, the compression spring 122 is compressed to reserve energy (see FIG. 7D). In the other words, the compression spring 122 is compressed to reserve energy when the right pedal crank 10 or the left pedal crank 20 is at the segment of applied force A, and the compression spring 122 releases reserved energy when at the segment of applied force B or segment of applied force D.

When the round hole 11 of the side board 1 and the square center hole 241 of the ratchet assembly 24 are coupled to the axle 30, the Ω-shaped locating plate 13 can then be fastened to the frame structure of the vehicle at the desired angle, for example, the Ω-shaped locating plate 13 can be fastened to the chain stay 40 of the vehicle (see FIG. 8), the seat tube 50 of the vehicle (see FIG. 9), or the down tube 60 of the vehicle (see FIG. 10).

While only one embodiment of the present invention has been shown and described, it will be understood that various modifications and changes could be made thereunto without departing from the spirit and scope of the invention disclosed. Further, the aforesaid vehicle can be a bicycle, a motorcycle, or a tricycle.

What the invention claimed is:

1. A vehicle pedal power saving mechanism mounted on the axle between two pedal cranks of a vehicle to facilitate pedaling of the pedal cranks, the vehicle pedal power saving mechanism comprising:

a side board mounted on the vehicle, said side board comprising a round hole, which receives the axle of the pedal cranks of the vehicle, a cylindrical shell remote from said round hole, said cylindrical shell defining a cylindrical receiving chamber, and a spring member mounted in the cylindrical receiving chamber inside said cylindrical shell;

a gear set, said gear set comprising a big gear, a small gear turned about a pivot at said side board and meshed with said big gear, and an one-way ratchet assembly mounted at the center of said big gear, said ratchet assembly having a square center hole, which receives the axle of the pedal cranks of the vehicle for permitting said ratchet assembly to be rotated with the axle; and a piston unit, said piston unit comprising a hollow piston moved in the cylindrical receiving chamber inside said cylindrical shell and supported on said spring member, a piston cap fixedly covered on said hollow piston, and a link having one end coupled to said piston cap and an opposite end pivoted said small gear at one side by a pivot;

wherein when the pedal cranks are pedaled to rotate the axle, said ratchet wheel assembly is driven to rotate said big gear and said small gear in one direction, causing said piston to be reciprocated by said link in said cylindrical shell to alternatively compress and release said spring member.

2. The vehicle pedal power saving mechanism of claim 1 wherein said big gear has an annular shape, and a crossed rib at the center, said crossed rib having a center portion, which holds said ratchet wheel assembly in place.

3. The vehicle pedal power saving mechanism of claim 1 further comprising a guard covered on said side board to protect said gear set and said piston unit.

4. The vehicle pedal power saving mechanism of claim 1 wherein said side board comprises a Ω-shaped locating plate at a back side wall thereof for fastening to a frame part of the vehicle.

5. The vehicle pedal power saving mechanism of claim 1 wherein said side board is fastened to a chain stay of the vehicle.

6. The vehicle pedal power saving mechanism of claim 1 wherein said side board is fastened to a seat tube of the vehicle.

7. The vehicle pedal power saving mechanism of claim 1 wherein said side board is fastened to a down tube of the vehicle.

* * * * *